Aug. 28, 1962 R. E. YAEGER 3,051,901

ENCODER FOR PULSE CODE MODULATION

Filed June 24, 1958 4 Sheets-Sheet 1

INVENTOR
R. E. YAEGER
BY R. B. Ardis
ATTORNEY

Aug. 28, 1962 R. E. YAEGER 3,051,901

ENCODER FOR PULSE CODE MODULATION

Filed June 24, 1958 4 Sheets-Sheet 2

INVENTOR
R. E. YAEGER
BY R. B. Anderson
ATTORNEY

Aug. 28, 1962 R. E. YAEGER 3,051,901

ENCODER FOR PULSE CODE MODULATION

Filed June 24, 1958 4 Sheets-Sheet 3

INVENTOR
R. E. YAEGER

BY R. B. Anderson

ATTORNEY

Aug. 28, 1962 R. E. YAEGER 3,051,901

ENCODER FOR PULSE CODE MODULATION

Filed June 24, 1958 4 Sheets-Sheet 4

INVENTOR
R. E. YAEGER
BY R. B. Adis
ATTORNEY

United States Patent Office 3,051,901
Patented Aug. 28, 1962

3,051,901

ENCODER FOR PULSE CODE MODULATION

Robert E. Yaeger, Bedminster, N.J., assignor to Bell Telephone Laboratories, Incorporated, New York, N.Y., a corporation of New York Filed June 24, 1958, Ser. No. 744,190
9 Claims. (Cl. 325—38)

This invention relates generally to pulse code modulation systems and more particularly to encoders for use in such systems for transforming signal amplitude samples into code groups of marks and spaces occupying a predetermined number of successive time slots.

In a pulse code modulation or PCM system, it is common practice to encode by sampling a signal at a rate sufficiently rapid to preserve substantially all of the intelligence contained therein, comparing each sample with a succession of different reference amplitudes or quantum levels, and using the results of the comparison to generate a code group representing the amplitude of each sample in terms of one form or another of the so-called binary code. The required reference amplitudes are sometimes constructed with the aid of flip-flops or bistable trigger circuits generating reference pulses which commence in respective ones of successive time slots and can persist until the end of the code group. Added together, such reference pulses provide the succession of different reference amplitudes in successive time slots that is needed for performing the comparison function. When individual reference pulses extend over more than a single time slot, however, the possibility of coding error arises if there is any tendency for a reference pulse to drift in amplitude from one time slot to the next. If there is an appreciable trail-off in reference pulse amplitude from the first to the last time slot of any code group, for example, the coding inaccuracy can be quite significant.

While it may sometimes be feasible in the above-described type of PCM encoder to stablize the reference pulse generators against drift between the leading and trailing edges of the reference pulses at the expense of additional circuit complexity, such a solution to the problem tends to be unattractive in a system intended for short-haul commercial telephone use. A PCM system suitable for commercial telephone use must be as simple and as rugged as possible, not only to minimize initial cost but also to insure maximum reliability and to simplify maintenance.

One object of the invention is, therefore, to increase the coding accuracy of a PCM encoder in as simple a manner as possible.

Another and more particular object is to avoid the coding inaccuracies in the less significant time slots of a PCM code group which would be caused by reference pulse level trail-off with time.

Still another object is to avoid any necessity for the use of long reference pulses in the comparison stages of a PCM encoder.

In accordance with a principal feature of the invention, regenerative pulse amplifiers are used instead of flip-flops in a PCM encoder to provide reference levels during successive time slots of a code group for comparison with the signal amplitude sample. Whenever a reference level is found less than the sample in its particular time slot, the reference pulse added for the first time during that time slot is completely regenerated during each succeeding time slot remaining in the code group. Longer reference pulses lasting for several time slots are thereby avoided, along with the possibility of inaccurate coding in the later time slots due to trail-off of the reference pulse amplitude with time. The regenerative pulse amplifiers are both simple and rugged, permitting increased coding accuracy to be realized with no sacrifice of either simplicity or reliability.

In general, a PCM encoder embodying the invention contains a multichannel control network in which the number of channels is equal to the number of time slots in each code group and each channel corresponds to a respective one of the time slots, a weighted summing network connected to transform simultaneous reference pulses from the individual control network channels into a single combined reference pulse for comparison purposes, and a comparison circuit to generate either marks or spaces, depending upon whether the combined reference pulse is larger or smaller in magnitude than the signal amplitude sample being encoded, during the respective time slots of each code group. In accordance with the present invention, a reference pulse is generated in each control network channel in its respective time slot and is completely regenerated in each succeeding time slot within the code group whenever the combined reference pulse from all channels is less than the signal amplitude sample in the time slot in which the channel reference pulse appears for the first time. In a number of important embodiments of the invention, each control network channel includes a regenerative pulse amplifier which is triggered during its respective time slot to generate a channel reference pulse and is retriggered during each succeeding time slot within the code group unless inhibited as a result of the combined reference pulse exceeding the sample being encoded.

For a more complete explanation of the invention, reference may be made to the following detailed description of a specific embodiment. In the drawings.

A four-digit encoder is used as the basis for the initial disclosure of the principles underlying the invention largely for reasons of simplicity. Such an encdore is not, of course, capable of transmitting speech waves with sufficient accuracy to permit its use in a commercial telephone system. With only sixteen reference amplitude levels to choose from in the encoding process, the so-called quantizing noise would be intolerable in such a system. It does serve as well as a larger system, however, to disclose the present contribution to the PCM encoder art and is somewhat more readily understandable.

Figure 1:
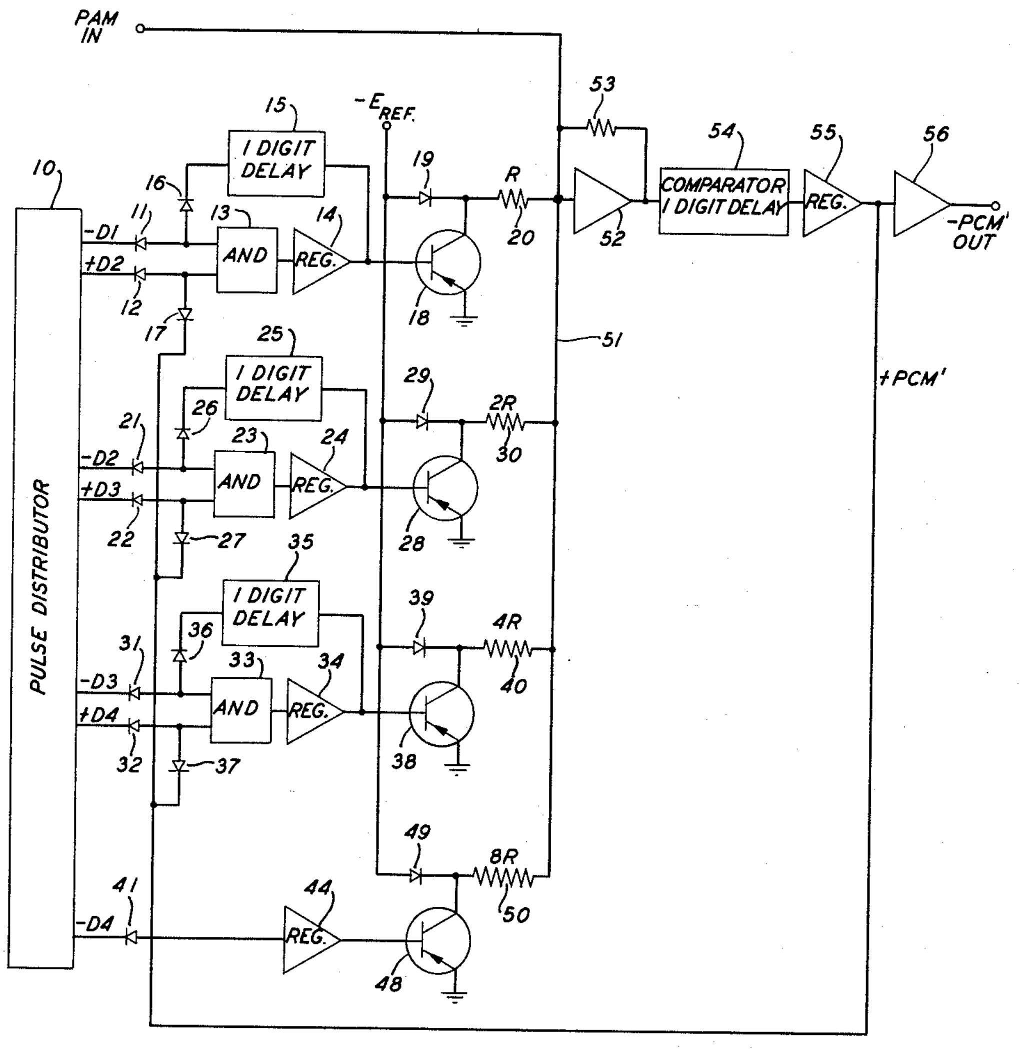
FIG. 1 is a combined schematic and block diagram of a simple four-digit PCM encoder embodying the invention.

Timing pulses in the four-digit encoder illustrated in FIG. 1 are obtained from a pulse distributor 10, which establishes the basic system pulse repetition rate and which may be of the general type disclosed in United States Patent 2,953,694, issued September 20, 1960, to R. L. Wilson. Each of the output leads of pulse distributor 10 shown in FIG. 1 carries either a positive-going or a negative-going pulse which occurs once each code group. The −D1 lead carries a negative-going pulse which occurs during the first time slot of each code group, the +D2 lead carries a positive-going pulse which occurs during the second time slot of each code group, and so on. These pulse trains are shown in lines (*a*) through (*g*) of FIG. 2 of the drawings.

The −D1 and +D2 leads from pulse distributor 10 in the embodiment of the invention illustrated in FIG. 1 are connected through respective diodes 11 and 12 to a so-called AND gate 13. In computer parlance, such a gate yields an output pulse only when both of its input connections are energized. The output of AND gate 13 is, in turn, connected to a regenerative pulse amplifier 14 which produces or "regenerates" a new pulse of standard phase and amplitude whenever its input is energized during code group "time slot" intervals. The output of regenerative pulse amplifier 14 is returned to the upper input connection of AND gate 13 through a one-digit delay circuit 15 and a diode 16. Delay circuit 15 serves to delay each output pulse produced by regenerative pulse amplifier 14 from one time slot to the next. Connected to the lower input connection of AND gate 13 is yet another diode 17, the purpose of which will become evident later. Diodes 11, 12, 16, and 17 are all poled for easy current flow away from AND gate 13.

The output of regenerative pulse amplifier 14 is also connected directly to the base electrode of a transistor switch 18. As illustrated, transistor 18 is of the p-n-p variety, since its direction of forward emitter current flow is into the emitter. The emitter electrode itself is grounded, and the collector is connected through a diode 19 to a source of negative reference potential. Diode 19 is poled for easy current flow from the reference source toward the collector electrode of transistor 18. From the collector electrode of transistor 18, a so-called weighting resistor 20 is connected to an output bus 51.

Regenerative pulse amplifier 14 and its associated equipment constitute the first comparison channel in the embodiment of the invention illustrated in FIG. 1. They make up, in other words, the comparison channel associated with the first time slot of each code group. Since, in the illustrated embodiment of the invention, a four-digit code is being used, there are four such comparison channels. The second and third channels are substantially the same as the first. In the second, pulses are received from distributor 10 on the —D2 and +D3 leads. Diodes 21 and 22 correspond to diodes 11 and 12, AND gate 23 corresponds to AND gate 13, regenerative pulse amplifier 24 corresponds to amplifier 14, delay circuit 25 corresponds to delay circuit 15, and diodes 26 and 27 correspond to diodes 16 and 17. The output of regenerative pulse amplifier 24 is connected to the base electrode of transistor switch 28, the collector electrode of which is connected to the negative reference source through a diode 29 and the output bus 51 through a weighting resistor 30. In the third channel, pulses are received from distributor 10 from the —D3 and +D4 leads. Diodes 31 and 32 correspond to diodes 11 and 12 in the first channel, AND gate 33 corresponds to AND gate 13, regenerative pulse amplifier 34 corresponds to amplifier 14, delay circuit 35 corresponds to delay circuit 15, and diodes 36 and 37 correspond to diodes 16 and 17. The output of regenerative pulse amplifier 34 is connected to the base electrode of a transistor switch 38, the collector electrode of which is connected to the reference source through a diode 39 and to the output bus 51 through a weighting resistor 40.

The fourth channel in the embodiment of the invention illustrated in FIG. 1 receives pulses from distributor 10 on the —D4 lead. These negative-going pulses pass through a diode 41, corresponding to diode 11 in the first channel, to a regenerative pulse amplifier 44. The output from amplifier 44 goes directly to a transistor switch 48, which corresponds to and operates in the same manner as transistor switch 18 in the first channel. The emitter electrode of transistor switch 48 is grounded, while the collector is connected to the reference source through a diode 49 and also to the output bus 51 through a weighting resistor 50.

The four weighting resistors 20, 30, 40, and 50 are related to one another in magnitude by powers of two as indicated. Thus the magnitude of resistor 30 in twice that of resistor 20, the magnitude of resistor 40 is four times that of resistor 20, and the magnitude of resistor 50 is eight times that of resistor 20. Resistors 20, 30, 40, and 50 form a weighted summing network for the reference current pulses generated during the various time slots in their respective channels. Each pulse from the first channel can be regarded, for purposes of the present explanation, as representing eight amplitude units, each pulse from the second can be regarded as representing four amplitude units, each pulse from the third can be regarded as representing two amplitude units, and each pulse from the fourth can be regarded as representing one amplitude unit. When pulses are present in all channels during the fourth time slot, the single combined reference pulse on output bus 51 thus represents fifteen amplitude units.

Signal amplitude samples to be encoded are supplied directly to output bus 51 with a polarity opposite to that of the reference pulses. These samples, which may from one point of view be considered pulse amplitude modulation or PAM pulses, take the form shown in line (*o*) of FIG. 2. Succssive samples represent four different telephone channels combined in time division multiplex, with each sample having sufficient time duration to permit an amplitude comparison to take place during each time slot of the PCM code group.

The resulting waveform on output bus 51 represents the difference between the successive signal amplitude samples and the combined reference waveforms and is supplied to an amplifier 52 having at least one negative feedback path 53. Amplifier 52 inverts the waveform in phase and supplies it to a voltage comparator 54 which has an automatic delay of one digit or time slot. Voltage comparator 54 generates a negative-going output pulse whenever the waveform received from amplifier 52 exceeds a predetermined value. The output of comparator 54 is supplied to a regenerative pulse amplifier 55. The output of regenerative amplifier 55 is, in turn, not only supplied through a linear amplifier 56 to the encoder output terminal but also returned to all but the last of the comparison channels by way of diodes 17, 27, and 37.

Figure 2:
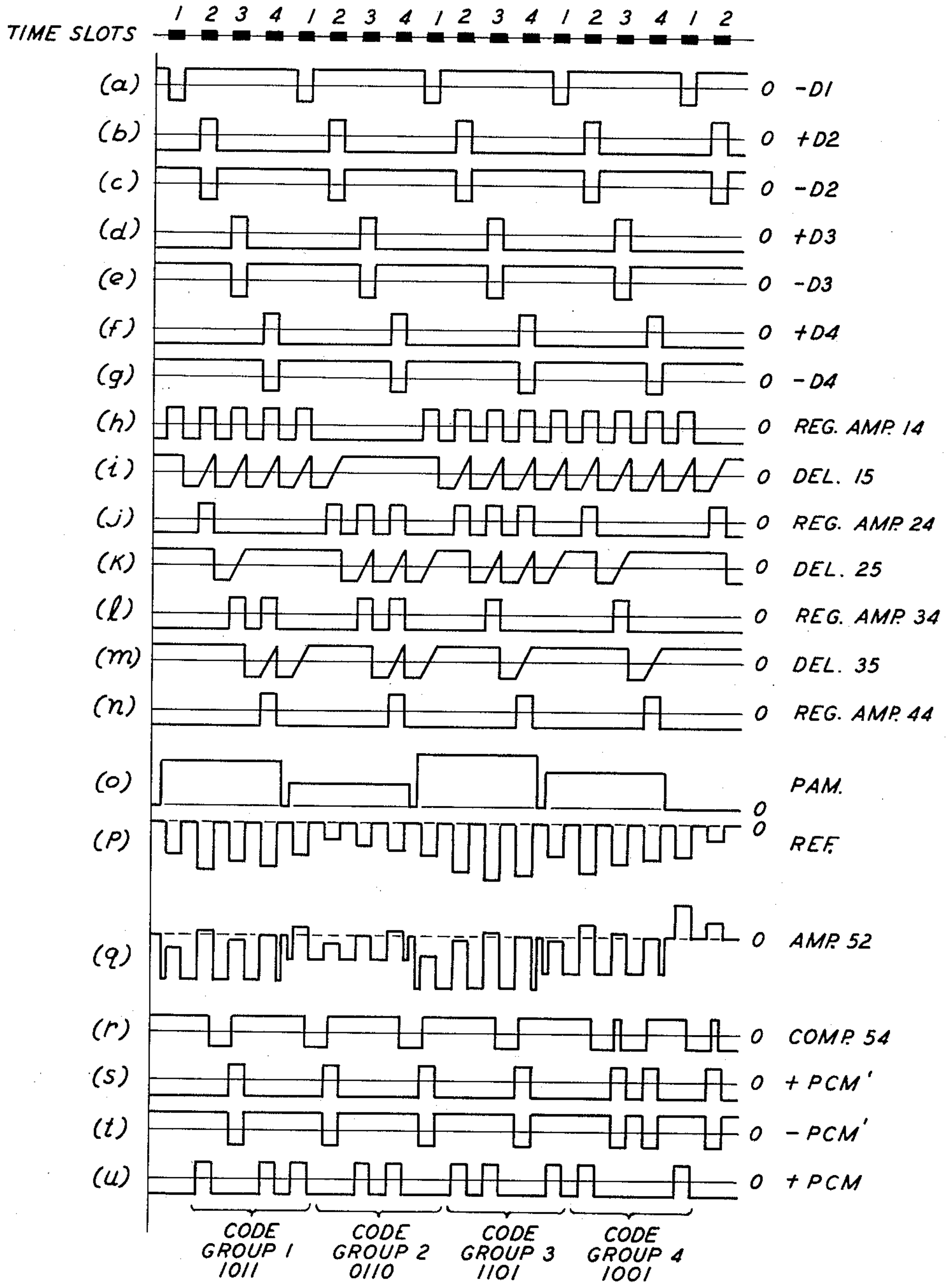
FIG. 2 shows a series of pulse trains and waveforms illustrating the mode of operation of the embodiment of the invention illustrated in FIG. 1.

The operation of the embodiment of the invention shown in FIG. 1 is illustrated by way of the waveforms shown in FIG. 2, where line (*o*) shows successive input signal amplitude samples of eleven, six, thirteen, and nine unit magnitudes respectively. The horizontal time scale is greatly expanded in FIG. 2, making each input sample or PAM pulse appear to be of fairly considerable time duration. In reality, though, these pulses are not "stretched," but extend for only an extremely short sampling time interval. Since each PCM code group is of approximately the same time duration as the input sample, it is the time slots within each code group that are of extremely short duration. In the illustrated example, there are four of these time slots per code group. As has been pointed out, this small number is used only to simplify the description. In the more refined commercial type encoder shown in FIGS. 3 and 4, each PCM code group contains at least seven time slots in order to permit more accurate coding and reduce so-called quantizing noise.

As shown in lines (*a*) and (*b*) of FIG. 2, both the —D1 and the +D2 inputs in FIG. 1 are negative during the first time slot of each code group. Because of the polarity of diodes 11 and 12, AND gate 13 has an output during this time slot which triggers regenerative pulse amplifier 14, as shown in line (*h*) of FIG. 2. In the absence of an output signal, the output of regenerative pulse amplifier 14 is negative, forward biasing transistor 18 and causing it to maintain a low impedance between its collector and emitter electrodes. The junction between diode 19 and resistor 20 is, therefore, effectively grounded until regenerative pulse amplifier 14 fires. Its output then goes positive, reverse biasing transistor 18 and causing a reference pulse of eight units amplitude to appear on output bus 51 during the first time slot. Since none of the other regenerative pulse amplifiers in the comparison channels of the embodiment of the invention illustrated in FIG. 1 are energized during the first time slot, the combined reference pulse on output bus 51 from all comparison channels has only the eight unit amplitude provided by the first channel, as shown in line (*p*) of FIG. 2.

In the example illustrated on line (*o*) of FIG. 2, the first signal amplitude sample to be encoded has an assumed magnitude of eleven units. When the eleven unit positive-going PAM pulse is added to the eight unit negative-going reference pulse on output bus 51, the net voltage is positive. This net voltage is amplified and inverted in phase by feedback amplifier 52, with the result shown in line (*q*) of FIG. 2. Since the voltage at the input of comparator 54 is thus negative during the first time slot, no output pulse is generated and regenerative pulse amplifier 55 is not triggered during the next time slot. Since the result of this first comparison is a 0 even though the sample being encoded is larger than the first or most significant reference pulse, the output pulse train being generated is obviously the inverse of the conventional binary code and is labeled PCM′ to distinguish it from the ordinary binary code, to which it may be readily converted if desired. This positive-going PCM′ wave, which is delayed one time slot from the basic pulse pattern established by distributor 10, is illustrated in line (*s*) of FIG. 2. The equivalent ordinary binary code waveforms are labeled PCM and are shown in line (*u*) of FIG. 2. In the embodiment of the invention illustrated in FIG. 1, however, the inverted binary code PCM′ is as convenient as an ordinary PCM waveform would be and, since it contains all of the information of the latter, is retained for final transmission after passing through linear amplifier 56. Amplifier 56 inverts the phase of the PCM′ waveform and produces the negative-going pulse train shown in line (*t*) of FIG. 2.

In accordance with an important feature of the invention, the reference pulse is regenerated in the first comparison channel during every time slot remaining in the code group since it was found smaller than the PAM signal amplitude sample. In this manner, a high degree of coding accuracy is assured and the possibility of error due to reference pulse amplitude trail-off with time is avoided. To accomplish this, the output pulse produced during the first time slot by regenerative pulse amplifier 14 is held over into the second time slot by the one-digit delay circuit 15, as shown in line (*i*) of FIG. 2. During the second time slot, the potentials on the −D1 and +D2 leads from pulse distributor 10 are both positive. In the absence of some other enabling mechanism, therefore, AND gate 13 would not operate during the second time slot and the reference pulse would not be regenerated. The delayed negative-going pulse from delay circuit 15, however, energizes the upper lead of AND gate 13. The positive-going PCM′ waveform illustrated in line (*s*) of FIG. 2, moreover, is fed back to the lower lead of AND gate 13. Since that waveform is delayed one time slot from the PAM input pulse, the voltage on the lower lead of AND gate 13 is negative during the second time slot and regenerative pulse amplifier 14 is triggered once again.

During the second time slot, in the embodiment of the invention illustrated in FIG. 1, a reference pulse is generated by regenerative pulse amplifier 24 in the second comparison channel in the same manner that one was generated by regenerative pulse amplifier 14 during the first. As shown in lines (*c*) and (*d*) of FIG. 2, the voltages supplied by pulse distributor 10 to the input leads of AND gate 23 are both negative and AND gate 23 is enabled. For the signal amplitude sample used in the example, reference pulses are therefore produced in both the first and second channels during the second time slot, as shown in lines (*h*) and (*j*), respectively, of FIG. 2. Weighting resistors 20 and 30 supply these pulses to output bus 51 with amplitudes of eight and four units, respectively. The single combined reference pulse appearing on output bus 51 during the second time slot thus has an amplitude of twelve units, as shown in line (*p*) of FIG. 2. Since this combined reference pulse exceeds the eleven unit amplitude of the sample, the potential ultimately supplied to comparator 54 by amplifier 52 is positive. Comparator 54 generates an output pulse which carries over into the third time slot in the manner shown in line (*r*) of FIG. 2 and triggers regenerative pulse amplifier 55, as shown in line (*s*) of FIG. 2. The result of the second comparison is thus a 1, even though the sample being encoded exceeds the sum of the first and second most significant reference pulses. This PCM′ wave, which is shown in line (*s*) of FIG. 2, may, as stated above, be converted to the more conventional binary or PCM form if desired.

During the third time slot, regenerative pulse amplifier 14 in the first channel is retriggered by the negative potentials received from delay circuit 15 and the +D2 lead. In accordance with the invention, however, regenerative pulse amplifier 24 in the second channel is not retriggered, since the combined reference pulse on output bus 51 was greater than the signal amplitude sample during the previous time slot. To prevent retriggering, both the −D2 and the +D3 leads from pulse distributor 10 are positive during the third time slot. The output of delay circuit 25 is negative, but AND gate 23 fails to pass a pulse unless its lower input lead is also negative. The PCM′ wave fed back to diode 27 is positive, however, during the third time slot because of the one-digit delay taking place in comparator 54 and regenerative pulse amplifier 55 and prevents amplifier 24 from retriggering.

A reference pulse is generated in the third channel for the first time during the third time slot by the negative potentials on both the −D3 and the +D4 leads. The output of regenerative pulse amplifier 34 opens transistor switch 38, and weighting resistor 40 transfers a reference pulse of two units magnitude to output bus 51 to be added to the eight unit pulse from the first channel, as shown on line (*p*) of FIG. 2. Since the resulting ten unit combined reference pulse is less than the PAM sample, no pulse is generated by comparator circuit 54 and the next time slot in the PCM′ wave is filled by a 0.

In the fourth time slot or comparison interval, a reference pulse is regenerated in the first channel, in accordance with the invention, in the same manner as in the third time slot. Since the reference pulse in the second channel was not regenerated during the third time slot, it is not regenerated in the fourth. In the third channel, however, the reference pulse is regnerated during the fourth time slot for the reason that the last combined reference pulse on output bus 51 was less than the signal amplitude sample being encoded. Although both the −D3 and +D4 leads are positive during the fourth time slot, delay circuit 35 supplies a negative voltage to the upper input lead to AND gate 33 while the PCM′ wave from regenerative pulse amplifier 55 supplies a negative voltage to the lower one. In the fourth channel, the −D4 lead is negative during the fourth time slot, causing regenerative pulse amplifier 44 to fire, as shown in line (*n*) of FIG. 2. The weighting resistors 20, 40, and 50 supply reference pulses of eight, two, and one units amplitude, respectively, to output bus 51, yielding a single combined reference pulse of eleven units amplitude.

The combined eleven unit reference pulse on output bus 51 during the fourth time slot just offsets the signal amplitude sample being encoded, with the result that zero input is applied to comparator 54. Comparator 54 generates no output in response to such an input, with the result that a 0 is registered in the PCM′ wave during the last time slot. The PCM′ code for an eleven unit sample is thus in the form 0100, which can, as stated above, be readily converted into the more conventional 1011 if desired.

Different signal amplitude samples are encoded in the same manner in the embodiment of the invention illustrated in FIG. 1. In the second example shown in FIG. 2, a signal amplitude sample of six units amplitude is encoded to give a PCM′ code of 1001. In the third and fourth, samples of thirteen and nine units amplitude are encoded to give PCM' codes of 0010 and 0110, respectively. Whatever the amplitude of the encoded sample, however, the principles of the invention are the same, i.e., the reference pulse in any one channel is regenerated during each succeeding time slot within the code group whenever the combined reference pulse on output bus 51 is less than the sample in amplitude in the time slot in which the particular reference pulse appears for the first time.

Figure 3:
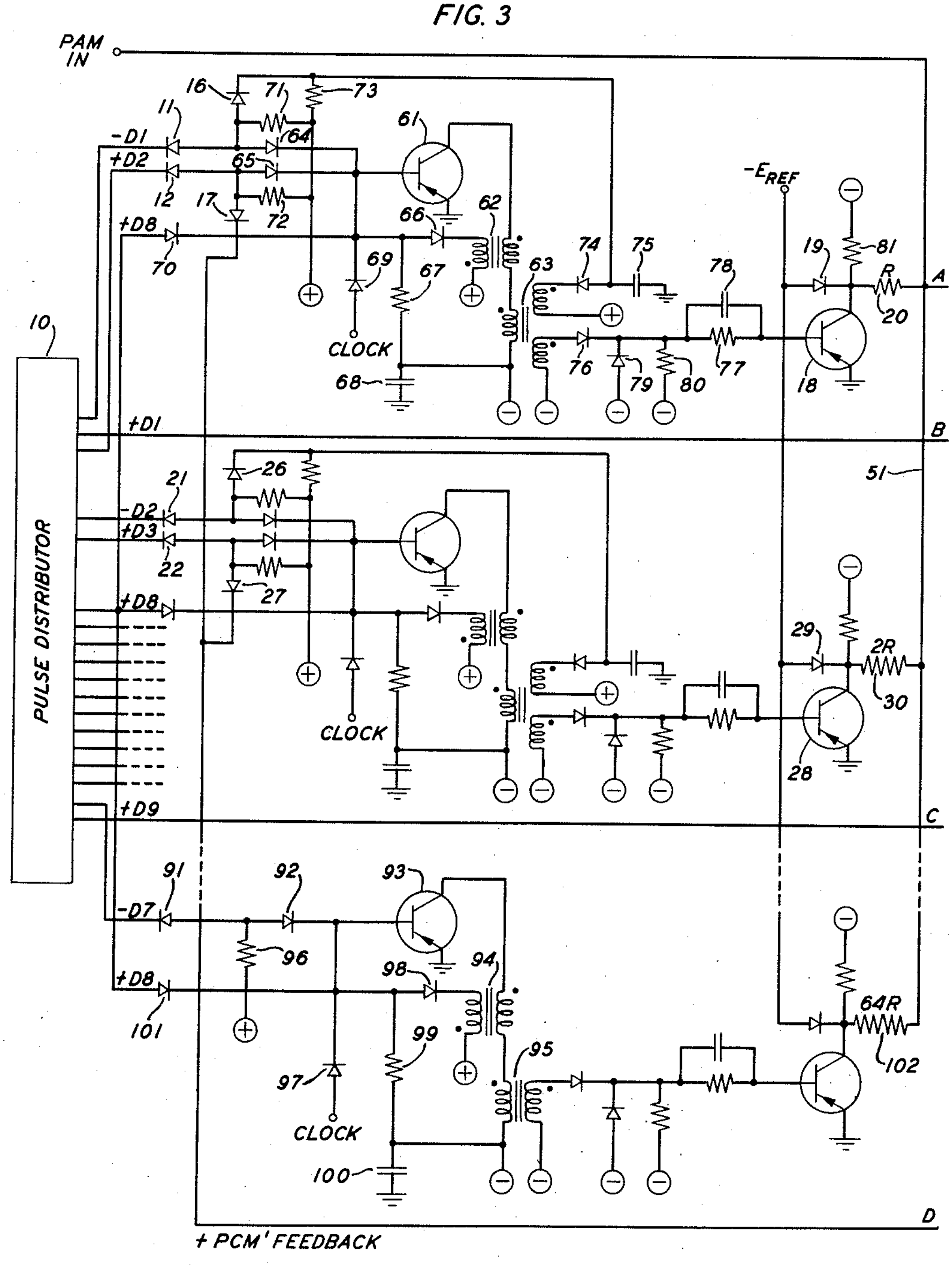
FIGS. 3 and 4, taken together, illustrate a more complex seven-digit PCM encoder embodying the present invention which is suitable for commercial telephone use.
Figure 4:
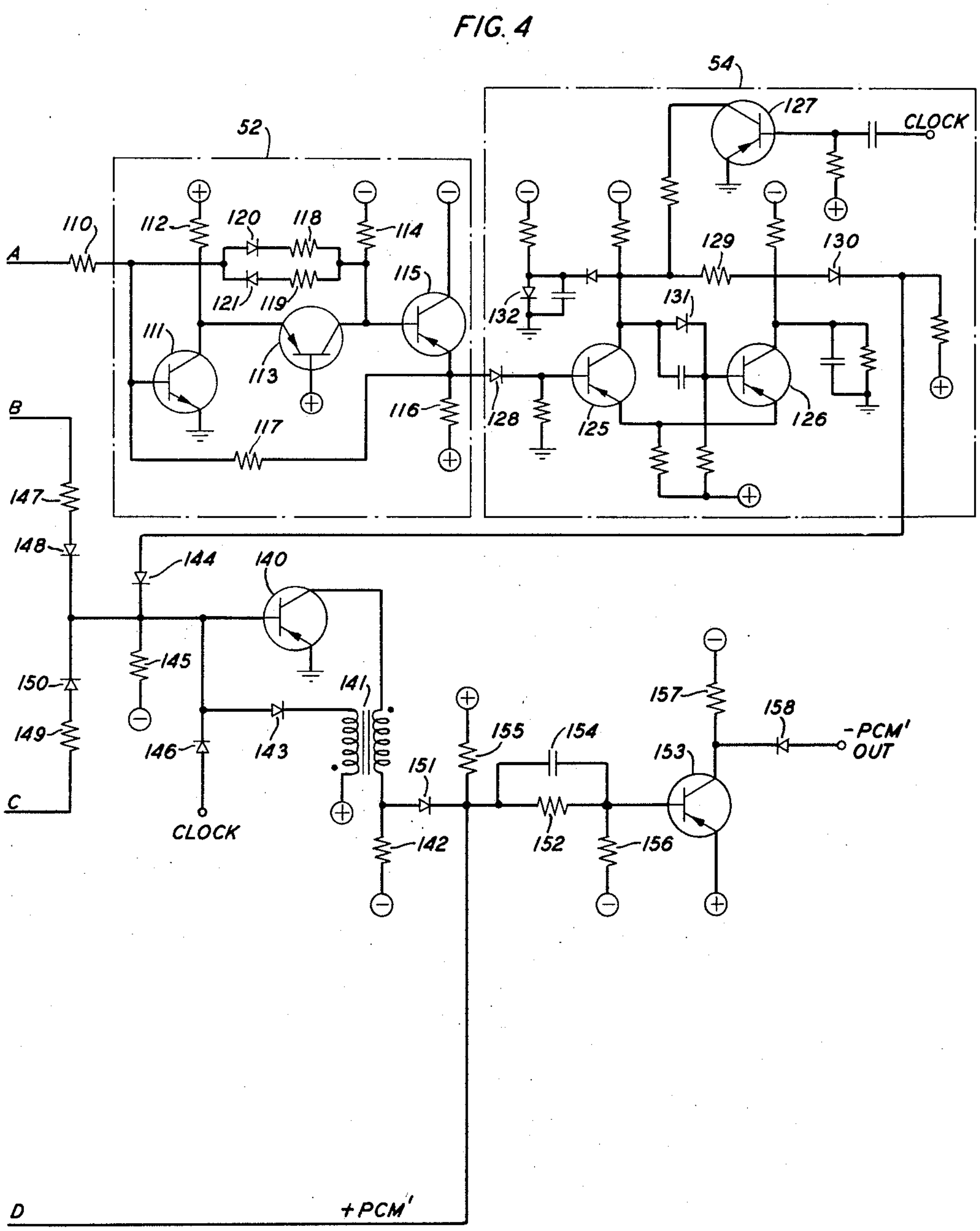

The more complete commerical telephone quality PCM encoder illustrated schematically in FIGS. 3 and 4 is like the encoder shown more generally in FIG. 1, but contains seven comparison channels instead of four for a greater number of amplitude comparison or quantum levels. Since the first six comparison channels are identical except for the size of the voltage resistor, only the first two are shown in FIGS. 3 and 4 and, of these, only the first will be described in detail. FIGS. 3 and 4 may be matched to one another by placing FIG. 3 to the left of FIG. 4 and maching connections where indicated by the letters A, B, C, and D.

In the encoder illustrated in FIGS. 3 and 4, pulse distributor 10 generates a repetitive pulse pattern in which each PCM code group normally contains eight time slots but at regular intervals contains nine. The first seven time slots in each code group are used for encoding purposes, in the manner illustrated in FIG. 1, while the eighth is available for telephone signaling purposes. The ninth time slot, when present, is used for synchronization or "framing" purposes. In a multichannel time division multiplex system of this kind, successive code groups receive samples from different telephone channels, and the term "frame" has been borrowed from television terminology to denote a sequence consisting of one code group for each channel. In the manner outlined in the above-identified patent of R. L. Wilson, this extra time slot is provided once each "frame" to permit the insertion of a pulse pattern insuring rigid synchronism between the apparatus at opposite ends of the PCM system.

The first comparison channel in FIG. 3 receives pulses from distributor 10 on the −D1 and +D2 leads. As in FIG. 1, the −D1 lead is normally positive but goes negative during the first time slot in each code group, while the +D2 lead is normally negative but goes positive during the second time slot. The pulses on these leads from distributor 10 control a blocking oscillator which is made up of a transistor 61, a phase-inverting feedback transformer 62, and a number of associated circuit elements. In the embodiment of the invention shown, transistor 61 as shown is of the p–n–p variety and has its emitter electrode grounded and its collector electrode connected through the primary winding of feedback transformer 62 and the primary winding of an output transformer 63 to a negative potential source. This source, like others in FIGS. 3 and 4, is shown merely as a small circle with an enclosed polarity designation in order to make the drawings as simple as possible. The complete connection, of course, is to the indicated side of a direct potential source, the other side of which is grounded.

The base of transistor 61 is connected to input diodes 11 and 12 through respective ones of a pair of AND gate diodes 64 and 65, both of which are poled for easy current flow toward transistor 61. The base of transistor 61 is also connected through a diode 66 and the secondary winding of feedback transformer 62 to a source of positive potential. Diode 66 is poled for easy current flow in the direction of positive emitter current flow in transistor 61. A third connection is from the base of transistor 61 through a current-limiting resistor 67 to the same negative source supplying the collector of transistor 61. That source is bypassed to ground by a capacitor 68. The remaining connections to the base of transistor 61 are from a so-called clock source through a diode 69 and from the +D8 lead of pulse distributor 10 through a diode 70. Both diodes 69 and 70 are poled oppositely to the direction of positive emitter current flow of transistor 61. The clock source supplies a sinusoidal wave of a frequency equal to the basic pulse repetition rate set by distributor 10. The clock wave is positive between time slots and is negative during the time slots defined by pulse distributor 10. As the name implies, the +D8 lead of distributor 10 is negative except during the eighth time slot, at which time it goes positive.

The AND gate composed of diodes 64 and 65 is completed by a pair of resistors 71 and 72. Resistor 71 is returned from the junction between diodes 11 and 64 to a source of positive potential, while resistor 72 is returned to that same source from the junction between diodes 12 and 65. A third resistor 73 is connected from the positive source to the side of diode 16 remote from diodes 11 and 64.

Output is taken from each of two secondary windings of transformer 63. One of these has one end connected to a small source of positive potential and the other end returned to ground through the series combination of a diode 74 and a capacitor 75. Diode 74 is poled for easy current flow toward the transformer winding, and the junction between diode 74 and capacitor 75 is connected to that between diode 16 and resistor 73 on the input side of the blocking oscillator. The other secondary winding of output transformer 63 carries the useful output of the blocking oscillator and has one end connected to a source of negative potential and the other connected through a diode 76 and a resistor 77 to the base electrode of transistor switch 18. Diode 76 is poled for easy current flow toward transistor 18 and resistor 77 is bypassed by a capacitor 78. Between diode 76 and resistor 77, a diode 79 is returned to a small negative potential and a resistor 80 is returned to a larger negative potential. Further to the right in FIG. 3, the collector electrode of transistor 18, in addition to being connected to diode 19 and weighting resistor 20, is returned to a negative potential through a dropping resistor 81.

The combination of the blocking oscillator and the AND gate which has just been described constitutes a regenerative pulse amplifier and serves, in accordance with the present invention, to regenerate reference pulses in each time slot for the remainder of the code group whenever the requisite conditions are fulfilled. The clock wave on diode 69 functions to provide rigid time control of the entire operation and prevents the blocking oscillator from firing except during negative clock excursions. AND gate diodes 64 and 65 are normally forward biased by the positive voltage source connected to resistors 71 and 72. When diodes 64 and 65 are conducting, the base electrode of transistor 61 is prvented from going negative. When both diodes 11 and 12 are forward biased during the first time slot, however, diodes 64 and 65 are back biased, leaving the base potential of transistor 61 free to fall. The blocking oscillator is then free to fire during the negative clock excursion and does so by virtue of the bias provided in the path from the transistor emitter electrode through the negative D.-C. source supplying the transistor collector electrode, and through resistor 67 to the transistor base electrode.

The positive swing of the blocking oscillator output is passed through the lower secondary winding of output transformer 63 to the base electrode of transistor switch 18 and operates the switch in the manner described in connection with FIG. 1. The negative-going overshoot, which occupies the interval between the first and second time slots, is held over into the next digit interval or time slot by capacitor 75 to provide the one-digit delay needed to retrigger the regenerative pulse amplifier. During the second time slot, this held overshoot forward biases diode 16 and causes upper AND gate diode 64 to receive a reverse bias. If the PCM' wave fed back to diode 17 is also negative, as a result of the signal amplitude sample exceeding the combined reference pulse on output bus 51, diode 17 is forward biased, diode 65 is reverse biased, and the blocking oscillator fires again. Since the +D8 lead is negative until the eighth time slot, it has no real effect on the operation of the circuit. When the signal amplitude sample fails to exceed the combined reference pulse in amplitude, the PCM' wave fed back to diode 17 is positive and the regenerative amplifier fails to retrigger.

As in FIG. 1, the final comparison channel in the embodiment of the invention illustrated in FIGS. 3 and 4 fails to contain any provision for retriggering the regenerative pulse amplifier. Since it supplies a reference pulse for the first time during the seventh time slot, there are no remaining time slots in the code group to contain a regenerated pulse. For the purpose of defining the present invention, it should be noted, a code group consists only of those time slots containing representations of the encoded PAM samples. Signaling and synchronizing information, which in the apparatus illustrated in FIGS. 3 and 4 is contained in the eighth and ninth time slots respectively, is not considered as being part of the code group. It is thus accurate to considere the reference pulse generated by the first comparison channel, for example, to be regenerated during every time slot remaining in the code group, i.e., during every time slot up to and including the seventh.

Since the final comparison channel illustrated in FIG. 3 need not contain retriggering circuitry, it is somewhat simpler than the others. Thus, negative-going pulses on the −D7 lead from pulse distributor 10 are supplied through a pair of oppositely poled diodes 91 and 92 to the base electrode of a p-n-p transistor 93. Diode 91 is poled for easy current flow toward pulse distributor 10. The emitter electrode of transistor 93 is grounded and the collector is connected through the primary winding of a phase-inverting feedback transformer 94 and the primary winding of an output transformer 95 to a negative source of direct potential. The junction between diodes 91 and 92 is returned through a resistor 96 to a source of positive potential. The base electrode of transistor 93, on the other hand, is connected through a diode 97 to the sinusoidal clock source, through a diode 98 and the secondary winding of feedback transformer 94 to a source of positive potential, and through a resistor 99 to the source of negative potential supplying the transistor collector electrode. The latter source is bypassed to ground by a capacitor 100. Diode 97 is poled toward the base electrode of transistor 93, while diode 98 is poled in the opposite direction. The +D8 lead from pulse distributor 10 is connected directly to the base electrode of transistor 93 through a diode 101. The latter diode is poled for easy current flow toward the base of transistor 93.

The regenerative pulse amplifier in the last comparison channel in the embodiment of the invention illustrated in FIGS. 3 and 4 is thus generally like the one in the first channel but has fewer components. The output path from the secondary winding of transformer 95 to output bus 51 is identical to that for the lower of the two secondary windings of transformer 63 in the first channel, with but one important exception, and will not be redescribed. The exception is the weighting resistor 102, which is connected in the same manner as weighting resistor 20 in the first channel but has a resistance sixty-four times as great.

The weighting resistors supplying current for the individual comparison channels in FIG. 3 constitute a resistance summing network which supplies a single combined reference pulse to output bus 51 during each time slot with an amplitude determined by the operation of each channel in producing or not producing an individual reference pulse. Each signal amplitude sample supplied from the PAM input lead is, as explained in connection with FIG. 1, opposite in polarity to the resulting combined reference pulse produced during each time slot. To increase coding accuracy by spreading small amplitude differences between the sample and each combined reference pulse over a relatively larger range of the comparator's operating characteristic, the difference signal on output bus 51 is supplied through a resistor 110 to feedback amplifier 52, which is shown in the upper left-hand corner of FIG. 4.

Amplifier 52 in FIG. 4 is a three-stage transistor amplifier with different feedback paths for signals of high and low amplitude. The first stage is a common-emitter stage in which the input is supplied directly to the base of an n-p-n transistor 111. The emitter of transistor 111 is grounded, and the collector is returned through a dropping resistor 112 to a source of positive potential. Output from the first stage is supplied from the collector of transistor 111 to the emitter of a common base stage. The p-n-p transistor 113 which makes up the common base stage has its base electrode returned to a source of positive potential and its collector electrode returned through a dropping resistor 114 to a source of negative potential. The third stage is a so-called emitter-follower stage including a p-n-p transistor 115. Its input electrode, the base, receives the signal from the collector of the second stage, its collector electrode is connected directly to a source of negative potential, and its emitter electrode is connected through a load resistor 116 to a source of positive potential.

One net phase turnover is provided by amplifier 52. As a result, the output at the emitter electrode of transistor 115 is positive-going whenever the combined reference pulse on output bus 51 exceeds the signal sample in amplitude. Of the two negative feedback paths, one is effective for net signals of small amplitude and the other is effective for all others. The first of these paths is a relatively large resistor 117, which is connected from the emitter electrode of transistor 115 back to the base electrode of transistor 111. Its size restricts the amount of degenerative feedback that takes place and maintains a relatively high gain for all signals below a predetermined critical amplitude to increase system sensitivity. That critical amplitude is fixed by the second negative feedback circuit path, which is made up of a pair of smaller resistors 118 and 119, each connected in series with a respective one of a pair of oppositely poled diodes 120 and 121 between the collector electrode of transistor 113 and the base electrode of transistor 111. Neither diode 120 nor diode 121 conducts in the forward direction until its forward bias exceeds a value of the order of one and one-half volts. It is this level that separates the action of the two feedback paths. As soon as diodes 120 and 121 begin to conduct, their feedback path becomes effective. Since resistors 118 and 119 are much smaller in magnitude than resistor 117, the effect of the second feedback path at large signal amplitudes is so much stronger than that of the first that the gain of the amplifier is effectively reduced at those amplitudes.

The output of amplifier 52 in FIG. 4, which is in the general form shown in line (*q*) of FIG. 2, is supplied to comparator 54. As explained in connection with FIG. 1, comparator 54 generates an output pulse only when the combined reference pulse exceeds the received signal amplitude sample. The circuitry shown for comparator 54 in FIG. 4 forms the basis for United States Patent 2,964,655, issued December 13, 1960, to H. Mann, and will be described only briefly.

Basically, comparator 54 in FIG. 4 is a transistorized improvement of the well-known Schmitt trigger circuit. Two transistors 125 and 126 of like conductivity type have their emitters connected directly together and the collector of the first connected to the base of the second to form respective regenerative feedback paths. A clocked transistor switch 127 is connected to the collector of the first transistor 125 to provide rigid time and phase synchronization. Input is supplied from expanding amplifier 52 through a diode 128, while output is taken from the collector electrode of transistor 125 through a resistor 129 and an avalanche breakdown diode 130. The coupling between the collector electrode of transistor 125 and the base electrode of transistor 126 includes a bypassed avalanche breakdown diode 131 poled for easy current flow toward transistor 126. Breakdown diode 131 fixes the maximum voltage drop between the collector electrode of transistor 125 and the base electrode of transistor 126 and compensates for the effects of temperature variations in another avalanche breakdown diode 132 connected to fix the maximum collector potential of transistor 125.

The output pulses from voltage comparator 54 in turn control a final regenerative pulse amplifier having as its active element a transistor 140. Together with a phase-inverting feedback transformer 141 and the associated circuitry, transistor 140 forms a blocking oscillator. The emitter electrode of transistor 140 is grounded and the collector is returned to a negative D.-C. source through the primary winding of transformer 141 and a load resistor 142. The base electrode of transistor 140 is connected to a positive D.-C. source through the series combination of a diode 143 and a secondary winding of transformer 141 and receives pulses from voltage comparator 54 through a diode 144. Diode 143 is poled for easy current flow toward the secondary winding of transformer 141, while diode 144 is poled for easy current flow toward transistor 140. The base electrode of transistor 140 is also returned to a negative potential source through a resistor 145 and to the clock source through a diode 146. Diode 146, like diode 144, is poled for easy current flow toward transistor 140.

The blocking oscillator composed of transistor 140 and transformer 141 transforms the output of comparator 54 into positive-going output pulses which take place during the regularly assigned code group time slots. Whenever a negative-going pulse produced by comparator 54 extends over into one of the periods defined by the negative half cycles of the clock wave, the blocking oscillator fires. The resulting pulse pattern at the collector electrode of transistor 140 forms the so-called +PCM′ wave which is used to control the reference pulse regeneration feature of the invention in the individual comparison channels shown in FIG. 3.

In addition to those pulses received from voltage comparator 54, the base electrode of transistor 140 is connected to receive pulses from the +D1 and +D9 leads of pulse distributor 10. The former lead is connected to the base of transistor 140 through the series combination of a resistor 147 and a diode 148, while the latter is similarly connected through the series combination of a resistor 149 and a diode 150. Diodes 148 and 150 are both poled for easy current flow toward transistor 140. The +D1 and +D9 leads have no effect on the operation of the output regenerative pulse amplifier as long as they are negative. When they are positive, however, they act as inhibitors and prevent the blocking oscillator from firing during negative excursions of the clock wave.

From the junction between the primary winding of transformer 141 and resistor 142 in FIG. 4, the output waveform is taken through the series combination of a diode 151 and a resistor 152 and applied to the base electrode of a final output transistor 153. Along with its associated circuit elements, transistor 153 forms a linear amplifier which increases the amplitude and inverts the phase of the blocking oscillator output waveform. Diode 151 is poled for easy current flow toward transistor 153 and resistor 152 is bypassed by a capacitor 154. The cathode of diode 151 is returned to a positive potential source through a resistor 155 and the base of transistor 153 is returned to a negative biasing source through a resistor 156. Transistor 153 is connected in the so-called common-emitter configuration, having its emitter electrode connected to a positive D.-C. potential source and its collector electrode connected to a negative D.-C. source through a dropping resistor 157. The collector electrode of transistor 153 is connected to the final encoder output terminal through a diode 158, which is poled for easy current flow toward the collector electrode.

The waveform at the collector of output transistor 153 is, like that shown in line (*t*) of FIG. 2, the so-called −PCM′ waveform and is the inverse of the ordinary binary code. In each code group, in other words, a 1 is represented by a negative potential during a recognized time slot and a 0 by a positive potential during such intervals, with the 0 indicating that the encoded sample is larger than the combined reference pulse associated with that time slot and the 1 indicating that it is smaller. As has already been pointed out, such a waveform is identical, from the information standpoint, to one in the ordinary binary code form and may readily be transformed to the latter if required. The +PCM′ waveform for use in the individual comparison channels is taken from the junction between diode 151 and resistor 152 in the manner indicated.

It is to be understood that the above-described arrangements are illustrative of the application of the principles of the invention. Numerous other arrangements may be devised by those skilled in the art without departing from the spirit and scope of the invention.

What is claimed is:

1. In a pulse code modulation encoder for transforming a signal amplitude sample into a code group of marks and spaces occupying a predetermined number of successive time slots, a plurality of channels equal in number to said predetermined number of time slots and each corresponding to a respective one of said time slots, means in each of said channels to generate a reference pulse in and substantially confined to its respective time slot, a weighted summing network connected to combine simultaneous reference pulses from said channels to form a single combined reference pulse substantially confined to its respective time slot, means to compare the amplitude of said combined reference pulse with said signal amplitude sample, means to regenerate said reference pulse in each of said channels during each succeeding time slot within the code group whenever said combined reference pulse is less than said signal amplitude sample in the time slot in which said reference pulse appears for the first time, and output means to generate a mark in each time slot during which the difference between said combined reference pulse and said signal amplitude sample has a predetermined polarity, leaving spaces in the remaining ones of said time slots.

2. In a pulse code modulation encoder for transforming a signal amplitude sample into a code group of marks and spaces occupying a predetermined number of successive time slots, a plurality of channels equal in number to said predetermined number of time slots and each corresponding to a respective one of said time slots, each of said channels including a regenerative pulse amplifier, means to trigger said amplifier in its respective time slot to generate a reference pulse substantially confined thereto, and means to retrigger said amplifier to regenerate said reference pulse during each succeeding time slot within the code group, a weighted summing network connected to combine simultaneous reference pulses from said channels to form a single combined reference pulse, substantially confined to its respective time slot, means to subtract said combined reference pulse from said signal amplitude sample, means to disable said retriggering means in each of said channels whenever said combined reference pulse is greater than said signal amplitude sample in the time slot in which the respective said amplifier is triggered for the first time, and output means to generate a mark in each time slot during which the difference between said combined reference pulse and said signal amplitude sample has a predetermined polarity, leaving spaces in the remaining ones of said time slots.

3. In a pulse code modulation encoder for transforming a signal amplitude sample into a code group of marks and spaces occupying *n* successive time slots, *n* channels each corresponding to a respective one of said time slots, means to generate a channel pulse of predetermined amplitude and time duration in each of said channels for the first time in each code group in its respective time slot, the time duration of each of said channel pulses being substantially confined to its respective time slot, a weighted summing network connected to combine any simultaneous channel pulses in said channels into a single reference pulse having an amplitude dependent, in accordance with a predetermined permutation code, upon the identity of the channels from which channel pulses are received, said reference pulse also being confined in time duration substantially to its respective time slot, means to compare the amplitude of said reference pulse with said signal amplitude sample, means to regenerate the channel pulse in each of said channels during each succeeding time slot within the code group whenever the difference between the reference pulse and said signal amplitude sample has a predetermined polarity in the time slot in which said channel pulse appears for the first time, and output means to generate a mark in each time slot during which the difference between the reference pulse and said signal amplitude sample has a predetermined polarity, leaving spaces in the remaining ones of said time slots.

4. In a pulse code modulation encoder for transforming a signal amplitude sample into a code group of marks and spaces occupying *n* successive time slots, *n* channels each corresponding to a respective one of said time slots, each of said channels including a regenerative pulse amplifier, means to trigger said amplifier in its respective time slot to generate a channel pulse of predetermined amplitude and time duration, the time duration of said channel pulse being substantially confined to its respective time slot, and means to retrigger said amplifier to regenerate said channel pulse during each succeeding time slot within the code group, a weighted summing network connected to combine any simultaneous channel pulses from said channels into a single reference pulse having an amplitude dependent, in accordance with a predetermined permutation code, upon the identity of the channels from which the channel pulses are received, said reference pulse also being confined in time duration substantial to its respective time slot, means to compare the amplitude of said reference pulse with said signal amplitude sample, means to disable said retriggering means in each of said channels whenever the difference between the reference pulse and said signal amplitude sample has a predetermined polarity in the time slot in which the respective said amplifier is triggered for the first time, and output means to generate a mark in each time slot during which the difference between the reference pulse and said signal amplitude sample has a predetermined polarity, leaving spaces in the remaining ones of said time slots.

5. In a pulse code modulation encoder for transforming a signal amplitude sample into a code group of marks and spaces occupying a predetermined number of successive time slots, a regenerative pulse amplifier, means to trigger said amplifier in one of said time slots to generate a reference pulse substantially confined thereto, means to retrigger said amplifier to regenerate said reference pulse during each succeeding time slot within the code group, means to subtract said reference pulse from said signal amplitude sample, and means to disable said retriggering means whenever said reference pulse is greater than said signal amplitude sample in the time slot in which said amplifier is triggered for the first time.

6. In a pulse code modulation encoder for transforming a signal amplitude sample into a code group of marks and spaces occupying a predetermined number of successive time slots, means to generate a pulse of predetermined amplitude and time duration in one of said time slots, the time duration of said pulse being substantially confined to said time slot, means to compare the amplitude of said signal amplitude sample with a reference level dependent upon the amplitude of said pulse, and means to regenerate said pulse during each succeeding time slot within the code group only when the difference between said signal amplitude sample and the reference level has a predetermined polarity in the time slot in which said pulse appears for the first time.

7. In a pulse code modulation encoder for transforming a signal amplitude sample into a code group of marks and spaces occupying a predetermined number of successive time slots, a regenerative pulse amplifier, means to trigger said amplifier in one of said time slots to generate a pulse of predetermined amplitude and time duration, the time duration of said pulse being substantially confined to said time slot, means to retrigger said amplifier to regenerate said pulse during each succeeding time slot within the code group, means to compare the amplitude of said signal amplitude sample with a reference level dependent upon the amplitude of said pulse, and means to disable said retriggering means whenever the difference between said signal amplitude sample and the reference level has a predetermined polarity in the time slot in which said amplifier is triggered for the first time.

8. In a pulse code modulation encoder for transforming a signal amplitude sample into a code group of marks and spaces occupying a predetermined number of successive time slots, means to generate a pulse of predetermined amplitude and time duration in the first of said time slots, the time duration of said pulse being substantially confined to said time slot, means to compare the amplitude of said signal amplitude sample with a reference level dependent upon the amplitude of said pulse, and means to regenerate said pulse during every remaining time slot within the code group only when the difference between said signal amplitude sample and said reference level has a predetermined polarity during said first time slot.

9. In a pulse code modulation encoder for transforming a signal amplitude sample into a code group of marks and spaces occupying a predetermined number of successive time slots, a regenerative pulse amplifier, means to trigger said amplifier in the first of said time slots to generate a pulse of predetermined amplitude and time duration, the time duration of said pulse being substantially confined to said time slot, means to retrigger said amplifier to regenerate said pulse during every remaining time slot within the code group, means to compare the amplitude of said signal amplitude sample with a reference level dependent upon the amplitude of said pulse, and means to disable said retriggering means during every remaining time slot within the code group whenever the difference between said signal amplitude sample and said reference level has a predetermined polarity during said first time slot.

References Cited in the file of this patent

UNITED STATES PATENTS

| | | |
|---|---|---|
| 2,454,780 | Deakin | Nov. 30, 1948 |
| 2,527,650 | Peterson | Oct. 31, 1950 |
| 2,537,843 | Meacham | Jan. 9, 1951 |
| 2,547,035 | McWhirter et al. | Apr. 3, 1951 |
| 2,603,715 | Vaughan | July 15, 1952 |
| 2,643,368 | Baker et al. | June 23, 1953 |
| 2,681,384 | Guanella | June 15, 1954 |
| 2,717,370 | Piper | Sept. 6, 1955 |
| 2,762,038 | Lubkin | Sept. 4, 1956 |
| 2,769,861 | Black | Nov. 6, 1956 |
| 2,806,139 | Le Clerc | Sept. 10, 1957 |
| 2,835,807 | Lubkin | May 20, 1958 |
| 2,969,535 | Foulkes | Jan. 24, 1961 |